United States Patent
Kim et al.

(10) Patent No.: US 9,632,358 B2
(45) Date of Patent: Apr. 25, 2017

(54) DISPLAY APPARATUS

(71) Applicant: SAMSUNG ELECTRONICS CO., LTD., Suwon-si (KR)

(72) Inventors: Seung Min Kim, Yongin-si (KR); Jeong Shan Na, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/738,401

(22) Filed: Jun. 12, 2015

(65) Prior Publication Data

US 2015/0370133 A1 Dec. 24, 2015

(30) Foreign Application Priority Data

Jun. 20, 2014 (KR) ........................ 10-2014-0075716

(51) Int. Cl.
*G02F 1/1335* (2006.01)
*G02B 5/04* (2006.01)
*G02F 1/1333* (2006.01)

(52) U.S. Cl.
CPC ....... *G02F 1/133608* (2013.01); *G02B 5/045* (2013.01); *G02F 1/133603* (2013.01); *G02F 2001/133317* (2013.01)

(58) Field of Classification Search
CPC .... G02B 5/045; G02B 5/0231; G02B 6/0021; G02B 6/0091; G02F 1/133602; G02F 1/133603; G02F 1/133606; G02F 1/133607; G02F 1/133608; G02F 2001/133317; G02F 1/13; G02F 1/133308; G02F 1/1335; G02F 1/133605; G02F 1/00; G02F 2001/13332; G02F 2001/133328; F21V 15/01
See application file for complete search history.

(56) References Cited

U.S. PATENT DOCUMENTS

| | | | |
|---|---|---|---|
| 7,969,526 B2* | 6/2011 | Yang | G02F 1/133308 349/187 |
| 8,964,131 B2* | 2/2015 | Maeda | G02F 1/133611 348/790 |
| 2002/0080297 A1 | 6/2002 | Sung | |
| 2006/0243948 A1* | 11/2006 | Ishiwa | G02B 6/0085 252/299.61 |
| 2008/0094831 A1* | 4/2008 | Matsumoto | G02F 1/133606 362/235 |

(Continued)

FOREIGN PATENT DOCUMENTS

| | | | |
|---|---|---|---|
| JP | 2002040413 A | * | 2/2002 |
| KR | 10-2011-0119361 A | | 11/2011 |
| KR | 10-2013-0120753 A | | 11/2013 |

*Primary Examiner* — Hargobind S Sawhney
(74) *Attorney, Agent, or Firm* — Sughrue Mion, PLLC (57) ABSTRACT

A display apparatus capable of improving distortion of an image displayed on a video wall by having the display apparatus provided with an ultra-slim bezel. The display apparatus includes a display panel on which an image is displayed, a light source positioned at a rear of the display panel, a bottom chassis in which the light source is accommodated, and a fixing mold configured to fix a front surface of the display panel and formed of transparent material, wherein the fixing mold is provided at an inner surface thereof with an accommodation portion into which a side end of the display panel is inserted so that the display panel is fixed.

24 Claims, 6 Drawing Sheets

(56) References Cited

U.S. PATENT DOCUMENTS

| | | | |
|---|---|---|---|
| 2010/0053861 A1* | 3/2010 | Kim | H04M 1/236 361/679.01 |
| 2011/0051019 A1* | 3/2011 | Hardacker | H04N 5/64 348/739 |
| 2011/0227810 A1* | 9/2011 | Mckinney | G06F 1/1626 345/1.3 |
| 2011/0242742 A1* | 10/2011 | Kim | H04N 5/64 361/679.01 |
| 2011/0255024 A1* | 10/2011 | Chung | G02B 6/0031 349/58 |
| 2013/0242483 A1* | 9/2013 | Hirasawa | G02F 1/133308 361/679.01 |
| 2013/0322113 A1* | 12/2013 | Yang | G02B 6/0088 362/606 |
| 2014/0204281 A1* | 7/2014 | Maeda | G02F 1/133611 348/794 |
| 2014/0204308 A1* | 7/2014 | Chung | G02B 6/0031 349/58 |
| 2014/0232958 A1* | 8/2014 | Venturas | G02F 1/133308 349/12 |
| 2015/0029751 A1* | 1/2015 | Kim | G02B 6/0025 362/608 |
| 2016/0054615 A1* | 2/2016 | Kim | G02B 6/0081 362/611 |

* cited by examiner

DISPLAY APPARATUS

CROSS-REFERENCE TO RELATED APPLICATION

This application claims priority from Korean Patent Application No. 10-2014-0075716, filed on Jun. 20, 2014, in the Korean Intellectual Property Office (KIPO), the disclosure of which is incorporated herein by reference in its entirety.

BACKGROUND

1. Field

Apparatuses and methods consistent with exemplary embodiments relate to a display apparatus for displaying an image.

2. Description of the Related Art

A display apparatus is an apparatus that displays data information such as characters, figures, and the like. In particular, a display apparatus may include a liquid crystal display device, and a frame on which the liquid crystal display device is mounted.

The liquid crystal display device is a passive optical device that does not emit light by itself. The liquid crystal display device may display an image using a backlight assembly attached to a rear surface of a display panel. The size and the efficiency of the liquid crystal display device vary with the structure of the backlight assembly, which has a great influence on the mechanical and optical characteristics of the liquid crystal display device.

In particular, the backlight assembly may be classified into either a direct-type backlight assembly or an edge-type backlight assembly depending on a position of a light source. In the direct-type backlight assembly, a light source is positioned below a liquid crystal display panel so as to irradiate light directly towards the entire panel. In the edge-type backlight assembly, a light source is arranged at one edge on the rear side of a liquid crystal display panel.

In the direct-type backlight unit, a plurality of lamps may be arranged in parallel to each other below a liquid crystal display panel. The direct-type backlight unit is configured to directly provide the liquid crystal display panel with light emitted from the plurality of lamps, and is mainly used for a large scale liquid crystal display device that requires a high brightness.

By using such a display device, various functions may be implemented, for example, a video wall. The video wall enables displaying across a plurality of display apparatuses an image. Each display apparatus displays a portion of the entire image, so that a single image is displayed across the plurality of display apparatuses.

SUMMARY

Aspects of one or more exemplary embodiments of the present disclosure provide a display apparatus having an ultra-slim bezel.

Additional aspects of the exemplary embodiments will be set forth in part in the description which follows and, in part, will be apparent from the description, or may be learned by practice of the exemplary embodiments.

According to an aspect of an exemplary embodiment of the present disclosure, there is provided a display apparatus including a display panel, a light source, a bottom chassis and a fixing mold. The display panel may allow an image to be displayed thereon. The light source may be positioned at a rear of the display panel. The bottom chassis may allow the light source to be accommodated therein. The fixing mold may be configured to affix a front surface of the display panel to the fixing mold. The fixing mold may be formed of transparent material. The fixing mold may comprise an accommodation portion configured to receive a side end of the display panel so that the display panel is fixed.

The accommodation portion may be formed to be recessed at a portion of an inner surface of the fixing mold.

The fixing mold may further comprise a bezel portion covering a part of a front surface of the display panel; and a side surface portion extending rearward from the bezel portion.

The bezel portion may include a prism portion on a rear surface of the bezel portion.

An image displayed beyond a periphery of the display panel may be the same as an image projected on the part of the display panel covered by the bezel portion.

A size of an image viewed at the front of the display panel may be larger than a size of the display panel.

The accommodation portion may be formed in the side surface portion.

A dark portion may be provided between an inner surface of the side surface portion that forms the accommodation portion and the display panel.

The dark portion may be provided at an inner surface of the accommodation portion that makes contact with the side end of the display panel.

The dark portion may be provided by coating a black dye on the inner surface of the side surface portion.

The dark portion may be provided at the side end of the display panel.

The side surface portion comprises an outer surface thereof with a reflective portion such that light introduced to the outer surface of the side surface portion is reflected toward an inner surface of the side surface portion.

The reflective portion may be provided by adhering a reflective tape on the outer surface of the side surface portion.

The accommodation portion may comprise a plurality of accommodation portions and spaced apart from each other in a front and rear side direction.

The display apparatus may further include an optical sheet and a diffusing plate at the rear of the display panel, and a side end of the optical sheet and a side end of the diffusing plate may be inserted into the plurality of accommodation portions so that the optical sheet and the diffusing plate are fixed to the fixing mold.

In accordance with another aspect of the present disclosure, a display apparatus includes a display panel, a light source, a bottom chassis and a fixing mold. The display panel may allow an image to be displayed thereon. The light source may be positioned at a rear of the display panel. The bottom chassis may allow the display panel and the light source to be accommodated therein. The fixing mold may be configured to affix a front surface of the display panel to the fixing mold. The fixing mold may be formed of transparent material. The fixing mold may include a bezel portion positioned at the front surface of the display panel and a side surface portion extending rearward from the bezel portion, and an extension portion may be provided at an inner of the side surface portion such that the display panel is seated thereon.

The bezel portion may be provided at a rear surface thereof with a prism portion.

A dark portion may be provided between an inner surface of the side surface portion and the display panel.

The side surface portion may be provided at an outer surface thereof with a reflective portion.

A plurality of the extension portions may be provided on the side surface portion.

The plurality of the extension portions may be spaced apart from each other in a front and rear side direction.

An optical sheet and a diffusing plate may be disposed at the rear of the display panel, and the optical sheet and the diffusing pate may be seated on at least one of the plurality of extension portions.

A fixing component of a display apparatus for displaying on a display panel and a periphery of the display panel, the fixing component may include an accommodation portion configured to receive a side end of the display panel in order to affix the display panel to the fixing component, wherein a portion of the fixing component on a frontward surface of the display panel is transparent.

The fixing component may further comprise a prism portion in the portion of the fixing component on the frontward surface of the display panel.

As is apparent from the above, when a video wall is formed by using a display apparatus having an ultra-slim bezel, the distortion of an image displayed on the video wall can be improved.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION OF EXEMPLARY EMBODIMENTS

Reference will now be made in to one or more exemplary embodiments and methods of accomplishing the same, examples of which are illustrated in the accompanying drawings. In this regard, the present exemplary embodiments may have different forms and should not be construed as being limited to the descriptions set forth herein. Like reference numerals refer to like elements throughout.

Figure 1:
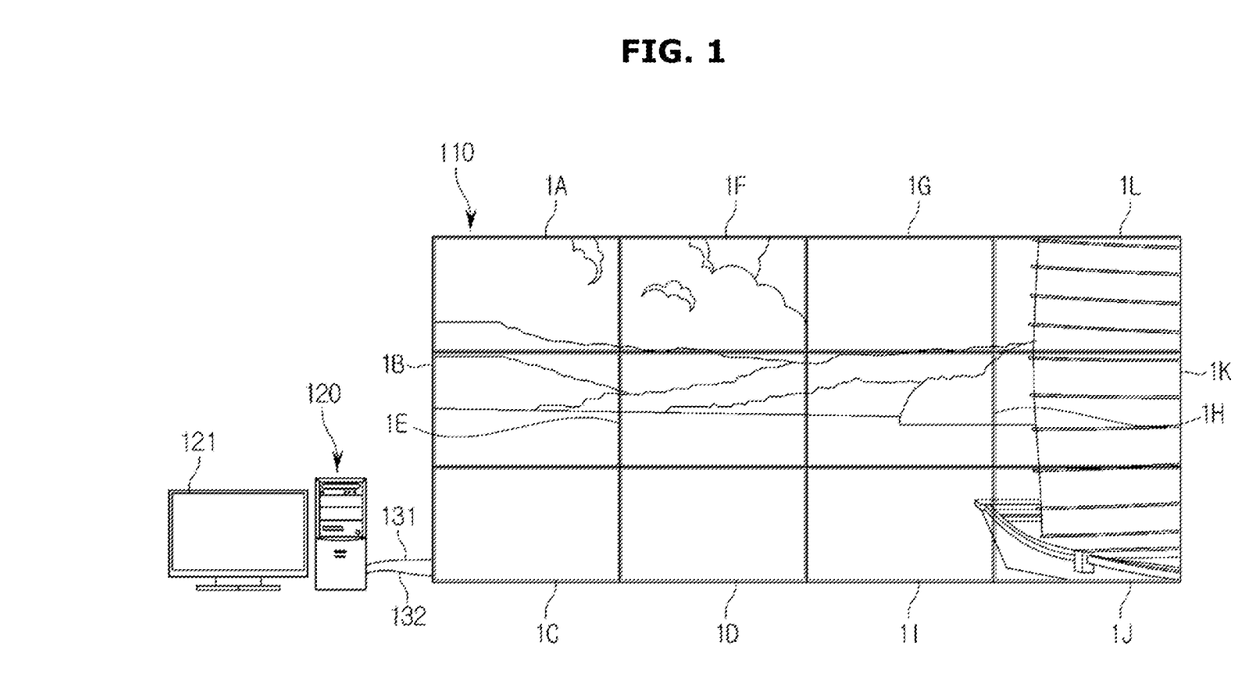
FIG. 1 illustrates a video wall system in accordance with an exemplary embodiment of the present disclosure.

FIG. 1 illustrates a video wall system in accordance with an exemplary embodiment of the present disclosure.

Referring to FIG. 1, a video wall system in accordance with an exemplary embodiment of the present disclosure includes a plurality of display apparatuses 1A-1L forming a video wall 110 and a controller 120 configured to control the plurality of display apparatuses 1A-1L. The controller 120 may be connected to the plurality of display apparatuses 1A-1L by one or more cables 131 and 132. The controller 120 may be a computer having at least one processor configured to control the plurality of display apparatuses 1A-1L.

The video wall 110 represents a large scale display formed by the plurality of display apparatuses 1A-1L arranged in one or more of a longitudinal direction or a transverse direction. The plurality of display apparatuses 1A-1L forming the video wall 110 is each configured to output a portion of the same image, so that the plurality of display apparatuses 1A-1L outputs an image while providing a perception as if the plurality of display apparatuses 1A-1L serves as a single display apparatus.

In some exemplary embodiments, the display apparatuses 1A-1L are connected to each other by a unified connector installed on each display apparatus. In some exemplary embodiments, one of the plurality of display apparatuses 1A-1L may be connected to the controller 120 through cables 131 and 132. The cables 131 and 132 may include a video signal cable 131 and a communication cable 132. With this configuration, the controller 120 may individually control the plurality of display apparatuses 1A-1L. In one or more exemplary embodiments, the controller 120 may individually adjust the brightness, contrast and position of an image displayed on the plurality of display apparatuses 1A-1L by using detection signals transmitted from the plurality of display apparatuses 1A-1L. The image displayed on the video wall 110 may also be output on a monitor 121 connected to the controller 120.

Because the plurality of display apparatuses 1A-1L forming the video wall 110 may have the same standardization, the following description will be made in relation to exemplary embodiments of a first display apparatus 1A.

Figure 2:
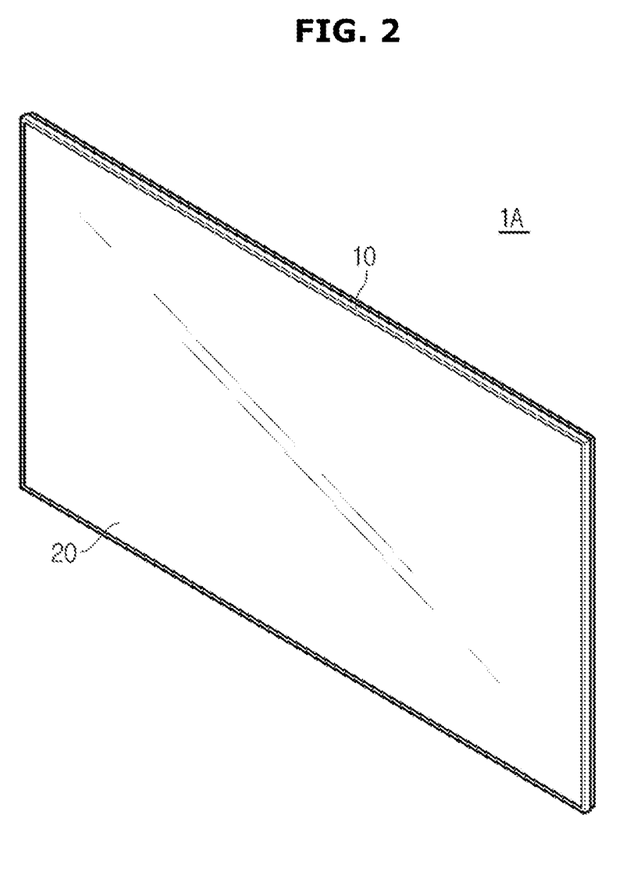
FIG. 2 is a perspective view illustrating a display apparatus in accordance with an exemplary embodiment of the present disclosure.
Figure 3:
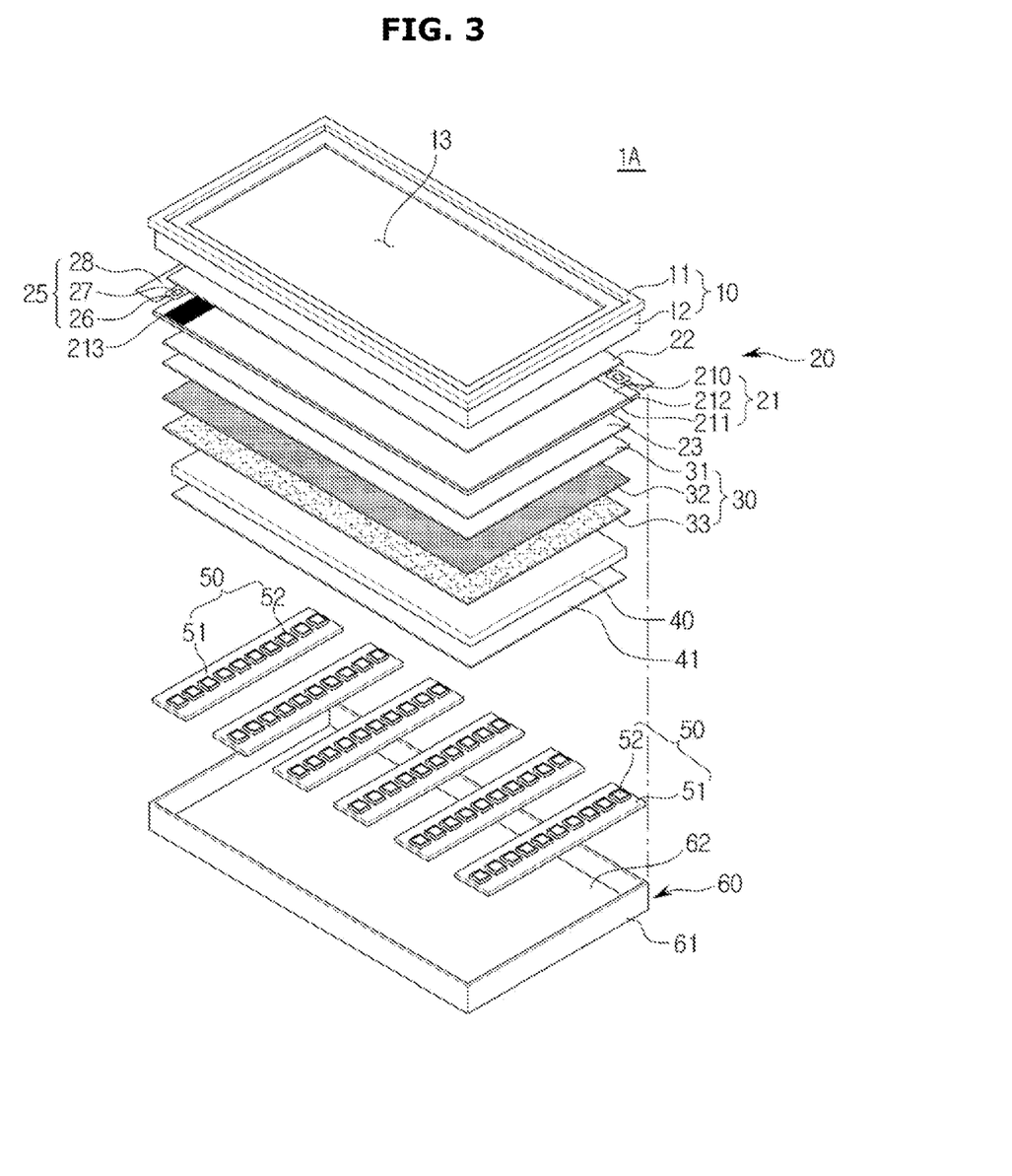
FIG. 3 is an exploded perspective view illustrating a display apparatus in accordance with an exemplary embodiment of the present disclosure.
Figure 4:
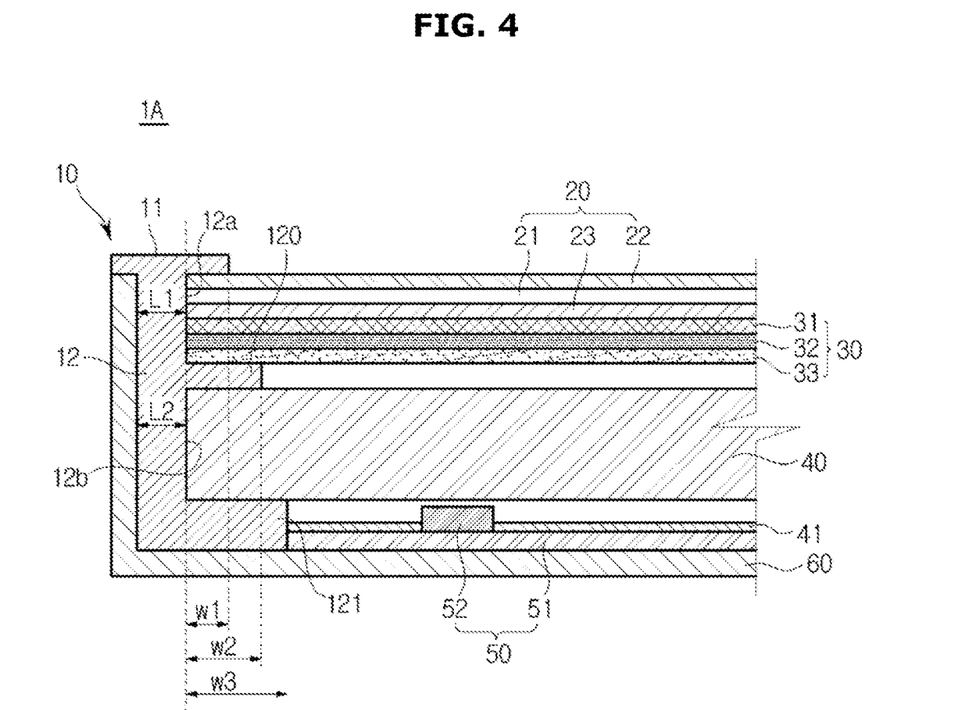
FIG. 4 is a cross sectional view illustrating a display apparatus in accordance with an exemplary embodiment of the present disclosure.

FIG. 2 is a perspective view illustrating a display apparatus in accordance with an exemplary embodiment of the present disclosure. FIG. 3 is an exploded perspective view illustrating a display apparatus in accordance with an exemplary embodiment of the present disclosure. FIG. 4 is a cross sectional view illustrating a display apparatus in accordance with an exemplary embodiment of the present disclosure.

Referring to FIGS. 2 to 4, the first display apparatus 1A according to an exemplary embodiment of the present disclosure includes a fixing mold 10, a display panel 20, a backlight unit 50 and a bottom chassis 60. The backlight unit 50 is disposed at the rear of the display panel 20 and is spaced apart from the display panel 20. The backlight unit 50 is accommodated in the bottom chassis 60 and the fixing mold 10 is configured to fix the front of the display panel 20.

A plurality of optical sheets 30 may be provided at the rear of the display panel 20. The plurality of optical sheets 30 may include a protection film 31 and prism films 32 and 33. The protection film 31 is disposed at the front of the prism films 32 and 33 to protect the prism films 32 and 33, which are vulnerable to scratches, from, for example, dust. A diffusing plate 40 may be positioned at the rear of the optical sheets 30.

A plurality of triangular prisms are arranged on an upper surface of the prism films 32 and 33, to focus light diffused from the diffusing plate 40 in a direction perpendicular to a rear surface of the display panel 20.

Two or more prism films 32 and 33 may be provided. Light passing through the prism films 32 and 33 travels perpendicular to the display panel 20 such that the display panel 20 has a uniform brightness.

Light emitted from the backlight unit 50 is diffused by the diffusing plate 40 and transferred to the optical sheets 30.

The diffusion plate 40 is provided with a coating layer that has a bead shape and is configured to diffuse light.

A reflective sheet 41 may be disposed at the rear of the diffusing plate 40. Light output from a lower surface of the diffusing plate 40 may be guided by the reflective sheet 41 toward the diffusing plate 40. The reflective sheet 41 may be formed of a plastic material, such as polyethylene terephthalate (PET) or polycarbonate (PC).

In one or more exemplary embodiments, the backlight unit 50 includes a printed circuit board 51 and a plurality of light emitting diodes 52 mounted on the printed circuit board 51. The light emitting diodes 52 may emit light towards the diffusing plate 40 positioned at the front of the backlight unit 50. The plurality of light emitting diodes 52 may be disposed on one surface of the printed circuit board 51 while spaced apart from each other by a predetermined interval. The backlight unit 50 is positioned at the rear of the diffusing plate 40 to irradiate light toward the diffusing plate 40.

The printed circuit board 51 is positioned at the rear of the diffusing plate 41, and the plurality of light emitting diodes 52 may protrude forward of the reflective plate 41. The printed circuit board 51 may be fixed to the bottom chassis 60 through a fastening member, such as a screw, or an adhesion member, such as a double-sided tape. A surface of the printed circuit board 51, which is opposite to a surface on which the plurality of light emitting diodes (LEDs) 52 are mounted, may be fixed to a base surface 62 of the bottom chassis 60.

The plurality of light emitting diodes 52 may emit white light, or may be implemented as a combination of a plurality of light emitting diodes emitting red, green and blue lights.

The display panel 20 may include a first substrate 211 on which a thin film transistor (TFT) and a pixel electrode are provided and a second substrate 210, which is provided at one side of the first substrate 211 and is provided with a color filter and a driving source. A liquid crystal layer 212 may be provided between the first substrate 211 and the second substrate 210. Polarization sheets 22 and 23 may be attached to a lower surface of the first substrate 211 or an upper surface of the second substrate 210. A module having the first substrate 211, the second substrate 210 and the liquid crystal layer 212 may be referred to as a liquid crystal display module 21.

In one or more exemplary embodiments, a driving unit 25 may be provided at one side of the first substrate 21 to apply a driving signal. The driving unit 25 may include a flexible printed circuit board 26, a driving chip 27 and a circuit board 28. The driving chip 27 may be mounted at one side of the flexible printed circuit board 26, and the circuit board 28 may be connected to the other side of the flexible printed circuit board 26.

The flexible printed circuit board 26 may be provided in the form of a Chip On Film (COF) in which a chip device is mounted on a base film. The flexible printed circuit board 26 may be provided in the form of a Tape Carrier Package using a Tape Automated Bonding (TAP) technology or in the form of a Chip On Glass (COG).

The second substrate 210 may be provided with black matrixes 213. Color filters may be provided between the black matrixes 213. For example, the black matrix 213 may be formed from organic material, such as a chrome oxide or a black pigment. The color filters may be regularly formed, and may be formed by repeated forming of three sub layers, each having different colors.

The display panel 20 may form a screen by adjusting the alignment of the liquid crystal layer 212. The display panel 20 is a non-emissive element that displays an image using light received from the backlight unit 50.

The bottom chassis 60 may include a bottom side surface 61 and the base surface 62. The bottom side surface 61 is formed to protrude forward along a circumference of the base surface 62. The backlight unit 50 may be mounted on the base surface 62. A heat radiation sheet may be disposed on the base surface 62 of the bottom chassis 60.

The fixing mold 10 may include a bezel portion 11 and a side surface portion 12. The bezel portion 11 may cover a periphery of a front surface of the display panel 20. The side surface portion 12 is formed to protrude rearward from a rear surface of the bezel portion 11. In one or more exemplary embodiments, at least one portion of the side surface portion 12 may make contact with the bottom chassis 60.

In some exemplary embodiments, at least one portion of the fixing mold 10 may make contact with the bottom chassis 60. For example, the bezel portion 11 of the fixing mold 10 may cover the front of the bottom side surface 61. The side surface portion 12 of the fixing mold 10 is disposed to make contact with an inner surface of the bottom side surface 61.

The fixing mold 10 may have an opening 13 through which the display panel 20 is exposed. A screen displayed on the display panel 20 is exposed forward through the opening 13.

In one or more exemplary embodiments, accommodation portions 12a, 12b may be formed in an inner surface of the side surface portion 12. The accommodation portions 12a, 12b are formed to be recessed from at least one portion of an inner surface of the side surface portion 12. When the bezel portion 11 is provided in a rectangular shape so that the first display apparatus 1A is provided in a rectangular shape, the side surface portion 12 may be made up of four planes formed to protrude from respective sides of the bezel portion 11. In some exemplary embodiments, the accommodation portions 12a, 12b may be provided at each of the four side surface portions 12. In some exemplary embodiments, the accommodation portions 12a, 12b may be provided at two side surface portions 12 opposite to each other among the four side surface portions 12. End portions of the display panel 20, the optical sheets 30 and the diffusing plate 40 may be inserted into the accommodation portions 12a, 12b and fixed.

For example, the side surface portion 12 may include a first accommodation portion 12a formed at a front portion of the side surface portion 12 and a second accommodation portion 12b formed rearward of the first accommodation portion 12a. The side ends of the display panel 20 and the optical sheets 30 may be inserted into the first accommodation portion 12a, and the side end of the diffusing plate 40 may be inserted into the second accommodation portion 12b. The backlight unit 50 may be provided at the rear of the diffusing plate 40 while accommodated in the bottom chassis 60.

A length L1 between an inner surface of the first accommodation portion 12a, which makes contact with an end of the display panel 20, and an outer surface of the side surface portion 12 may be equal to or substantially equal to a length L2 between an inner surface of the second accommodation portion 12b, which makes contact with an end of the diffusing plate 40, and the outer surface of the side surface portion 12.

When a portion of the side surface portion 12, which extends inward of the first display apparatus 1A to be parallel to the display panel 20 between the first accommodation portion 12a and the second accommodation portion 12b is referred to as a first extending portion 120, and a portion of the side surface portion 12, which extends inward of the first display apparatus 1A to be parallel to the display panel 20 at the rear of the second accommodation portion 12b, is referred to as a second extending portion 121, at least one portion of the display panel 20 is seated on the first extension portion 120 and at least one portion of the diffusing plate 40 is seated on the second extension portion 121.

A portion of the bezel portion 11 spaced apart by a predetermined distance from the first extension portion 120 or the second extension portion 121 and extending inward of the first display apparatus 1A beyond a line L provided in a front side and rear side direction has an extension length W1 different from an extension length W2 of the first extension portion 120 and an extension length W3 of the second extension portion 121. In this case, the line L may represent a straight line extending in a front and rear side direction in perpendicular to the display panel 20 or the diffusing plate 40 while passing the end of the display panel 20 or the end of the diffusing plate 40.

The second extension portion 121 may be formed to be seated on the base surface 62 of the bottom chassis 60.

The extension length W1 of the bezel 11 may be shorter than each of the extension length W2 of the first extension portion 120 and the extension length W3 of the second extension portion 121. The extension length W3 of the second extension portion 121 may be longer than the extension length W2 of the first extension portion 120.

The side end of the display panel 20 and the side end of the optical sheet 30 may be surrounded by the inner surface of the first accommodation portion 12a. The side end of the diffusing plate 40 may be surrounded by the inner surface of the second accommodation portion 12b.

The fixing mold 10 may be formed of transparent material. Light emitted from the light emitting diode 52 may pass through the fixing mold 10. Light emitted from the light emitting diode 52 may be diffused by the diffusing plate 40 and transferred frontwardly towards the display panel 20. Light emitted from the light emitting diode 52 may pass through the first extension portion 120 and the second extension portion 121 and then to the display panel 20 located at the rear of the bezel 11.

The bezel portion 11 may be transparent, so that even an image displayed on a certain area of the display panel 20, which is covered by the bezel portion 11, is viewed at the front of the first display apparatus 1A. A user in front of the display 1A may view the image displayed on the entire area of the display panel 20.

In addition, because the fixing mold 10 is formed of transparent material, the amount of light transferred to the periphery of the display panel 20 is increased when compared to the conventional technology, thereby preventing the brightness of the display panel 20 from being lowered at the periphery thereof. Accordingly, uniform image quality is obtained throughout the display panel 20.

Figure 5:
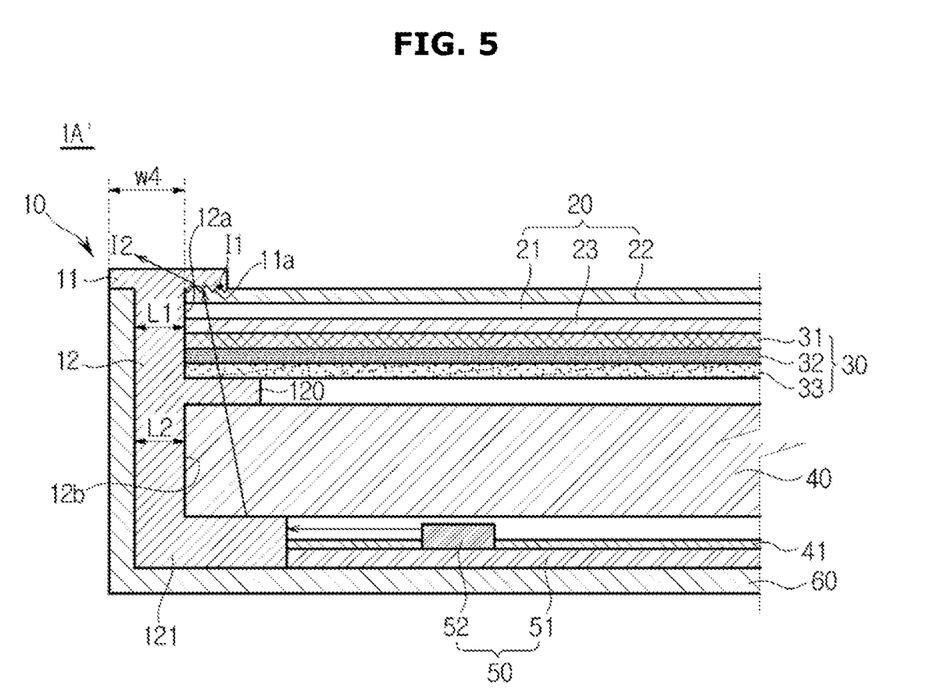
FIG. 5 is a cross sectional view illustrating a display apparatus in accordance with an exemplary embodiment of the present disclosure.

FIG. 5 is a cross sectional view illustrating a display apparatus in accordance with an exemplary embodiment of the present disclosure.

Referring to FIG. 5, a display apparatus 1A' according to an exemplary embodiment of the present disclosure is provided with a prism portion 11a formed at one side of the bezel portion 11. The prism portion 11a may be provided on a rear surface of the bezel portion 11, which makes contact with a front surface of the display panel 20. Light passing through the display panel 20 located at the rear of the bezel portion 11 may be refracted by the prism portion 11a and then refracted to the outside of the display panel 20.

The image that is the same as the image displayed on an area of the display panel 20, which is covered by the bezel portion 11, may be displayed at the outside of the display panel 20. Referring to FIG. 5, light introduced to region 11 of the display panel 20 is refracted by the prism portion 11a and thus travels along path 12. As the light travels along path 12, the image displayed on region 11 of the display panel 20 may be formed at an upper end of the bezel portion 11 outside the display panel 20. Accordingly, an image viewed from the front of the display panel 20 may have a size larger than a size of the display panel 20.

By the refraction of light at the prism portion 11a, the image that is the same as the image displayed on a certain area of the display panel 20 is displayed on an area of the bezel portion 11 outside the display panel 20, thereby providing a visual effect as if an active region displaying an image is expanded and an inactive region between the outside of the display panel 20 and an outer end of the bezel 11 is reduced. Accordingly, a plurality of display apparatuses each having the same configuration as that of the first display apparatus 1A' are implemented as a video wall, an inactive region between adjacent display apparatuses is reduced when compared to the conventional technology, so that the distortion of the image displayed on the video wall may be reduced.

Figure 6:
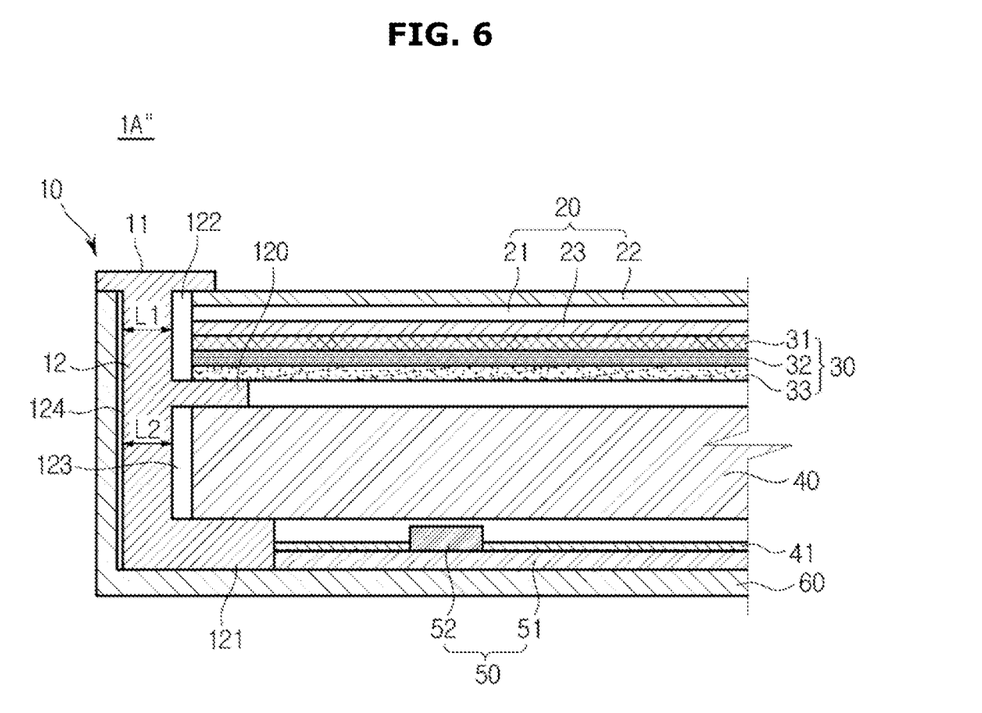
FIG. 6 is a cross sectional view illustrating a display apparatus in accordance with an exemplary embodiment of the present disclosure.

FIG. 6 is a cross sectional view illustrating a display apparatus in accordance with an exemplary embodiment of the present disclosure.

Referring to FIG. 6, a first display apparatus 1A" according to an exemplary embodiment of the present disclosure is provided with dark portions 122 and 123 at one side of a fixing mold 10, and a reflective portion 124.

When the fixing mold 10 is formed of transparent material, light leaks out of a gap between an end of the display panel 20 accommodated in the bottom chassis 60 and fixed by the fixing mold 10 and the side surface portion 12 of the fixing mold 10, which is referred to as a light leakage. In order to prevent light leakage, the dark portions 122 and 123 may be formed on an inner surface of the side surface portion 12. The dark portions 122 and 123 may be formed by coating a black dye on the inner surface of the side surface portion 12. The dark portion 122 may be provided on a region of the side surface portion 12 that makes contact with the display panel 20. In addition, the dark portion 123 may be provided on a region of the side surface portion 12 that makes contact with the diffusing plate 40.

The dark portions 122 and 123 may be provided on outer side surfaces of the display panel 20, the optical sheet 30 and the diffusing plates 40 that make contact with the side surface portion 12.

The reflective portion 124 may be provided on an outer surface of the side surface portion 12. The reflective portion 124 may be implemented by an outer surface of the side surface portion 12 coated with a high reflection dye or attached with a reflective tape. Light introduced toward the outer surface of the side surface portion 12 is reflected by the reflective portion 124 and transferred to the interior of the display apparatus 1.

Accordingly, light leakage of the display apparatus 1A" is prevented by the dark portions 122 and 123 and the reflective portion 124.

As described above, the fixing mold 10 is formed of transparent material, so that an effective display area of the display panel 20 in which an image is displayed is increased. In one or more exemplary embodiments, the prism portion is provided on the rear surface of the bezel portion of the fixing mold, so that the effective display area is further expanded. Even if the fixing mold is formed of transparent material, because the reflective portion or the dark portion is provided on the side surface portion of the fixing mold, light leakage is prevented and the image quality is prevented from being degraded.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus comprising:
    a display panel;
    a light source disposed behind the display panel;
    a bottom chassis in which the light source is accommodated; and
    a fixing mold configured to affix a front surface of the display panel to the fixing mold, the fixing mold being formed of transparent material, the fixing mold comprising an accommodation portion configured to receive a side end of the display panel so that the display panel is fixed.

2. The display apparatus of claim 1, wherein the accommodation portion is formed to be recessed at a portion of an inner surface of the fixing mold.

3. The display apparatus of claim 1, wherein the fixing mold further comprises a bezel portion covering a part of the front surface of the display panel; and
    a side surface portion extending rearward from the bezel portion.

4. The display apparatus of claim 3, further comprising a prism portion on a rear surface of the bezel portion.

5. The display apparatus of claim 4, wherein an image displayed beyond a periphery of the display panel is the same as an image projected on the part of the display panel covered by the bezel portion.

6. The display apparatus of claim 4, wherein a size of an image viewed at the front of the display panel is larger than a size of the display panel.

7. The display apparatus of claim 3, wherein the accommodation portion is formed in the side surface portion.

8. The display apparatus of claim 3, wherein a dark portion is provided between an inner surface of the side surface portion that forms the accommodation portion and the display panel.

9. The display apparatus of claim 8, wherein the dark portion is provided at an inner surface of the accommodation portion that makes contact with the side end of the display panel.

10. The display apparatus of claim 9, wherein the dark portion comprises a black dye on the inner surface of the side surface portion.

11. The display apparatus of claim 8, wherein the dark portion is provided at the side end of the display panel.

12. The display apparatus of claim 3, wherein the side surface portion comprises an outer surface thereof with a reflective portion such that light introduced to the outer surface of the side surface portion is reflected toward an inner surface of the side surface portion.

13. The display apparatus of claim 12, wherein the reflective portion comprises a reflective tape on the outer surface of the side surface portion.

14. The display apparatus of claim 1, wherein the accommodation portion comprises a plurality of accommodation portions spaced apart from each other in a front and rear side direction.

15. The display apparatus of claim 14, further comprising an optical sheet and a diffusing plate at the rear of the display panel, and a side end of the optical sheet and a side end of the diffusing plate inserted into the plurality of accommodation portions so that the optical sheet and the diffusing plate are fixed to the fixing mold.

16. A display apparatus comprising:
    a display panel;
    a light source disposed behind the display panel;
    a bottom chassis in which the display panel and the light source are accommodated; and
    a fixing mold configured to affix a front surface of the display panel to the fixing mold, the fixing mold being formed of transparent material, the fixing mold comprises a bezel portion positioned at the front surface of the display panel and a side surface portion extending rearward from the bezel portion, and an extension portion is provided at an inner of the side surface portion such that the display panel is seated thereon.

17. The display apparatus of claim 16, wherein the bezel portion is provided at a rear surface thereof with a prism portion.

18. The display apparatus of claim 16, wherein a dark portion is provided between an inner surface of the side surface portion and the display panel.

19. The display apparatus of claim 16, wherein the side surface portion is provided at an outer surface thereof with a reflective portion.

20. The display apparatus of claim 16, wherein a plurality of the extension portions are provided on the side surface portion.

21. The display apparatus of claim 20, wherein the plurality of the extension portions are spaced apart from each other in a front and rear side direction.

22. The display apparatus of claim 20, wherein an optical sheet and a diffusing plate are disposed at the rear of the display panel, and the optical sheet and the diffusing pate are seated on at least one of the plurality of extension portions.

23. A fixing component of a display apparatus for displaying on a display panel and a periphery of the display panel, the fixing component comprising:
    an accommodation portion configured to receive a side end of the display panel in order to affix the display panel to the fixing component,
    wherein a portion of the fixing component on a frontward surface of the display panel is transparent.

24. The fixing component of claim 23, further comprising a prism portion in the portion of the fixing component on the frontward surface of the display panel.

* * * * *